United States Patent
Wiedemeier et al.

(10) Patent No.: US 9,783,658 B2
(45) Date of Patent: *Oct. 10, 2017

(54) RUBBER MIXTURES CONTAINING SILICIC ACID AND SULFUR-CONTAINING ADDITIVES

(75) Inventors: Melanie Wiedemeier, Dormagen (DE); Hermann-Josef Weidenhaupt, Pulheim (DE); Ulrich Feldhues, Bergisch-Gladbach (DE); Irene Moll, Neuss (DE)

(73) Assignee: LANXESS Deutschland GmbH, Cologne (DE)

( * ) Notice: Subject to any disclaimer, the term of this patent is extended or adjusted under 35 U.S.C. 154(b) by 622 days.

This patent is subject to a terminal disclaimer.

(21) Appl. No.: 14/114,362

(22) PCT Filed: Apr. 27, 2012

(86) PCT No.: PCT/EP2012/057854
§ 371 (c)(1),
(2), (4) Date: Feb. 12, 2014

(87) PCT Pub. No.: WO2012/146755
PCT Pub. Date: Nov. 1, 2012

(65) Prior Publication Data
US 2014/0155518 A1    Jun. 5, 2014

(30) Foreign Application Priority Data
Apr. 29, 2011 (EP) .................................... 11164319

(51) Int. Cl.
| | | |
|---|---|---|
| C08K 3/36 | (2006.01) | |
| C08K 5/372 | (2006.01) | |
| C08K 13/02 | (2006.01) | |
| B60C 1/00 | (2006.01) | |
| C08K 5/548 | (2006.01) | |
| C08L 9/06 | (2006.01) | |
| C08K 5/378 | (2006.01) | |

(52) U.S. Cl.
CPC .............. *C08K 13/02* (2013.01); *B60C 1/00* (2013.01); *C08K 3/36* (2013.01); *C08K 5/372* (2013.01); *C08K 5/378* (2013.01); *C08K 5/548* (2013.01); *C08L 9/06* (2013.01)

(58) Field of Classification Search
CPC ........... C08K 3/36; C08K 5/372; C08K 5/548
See application file for complete search history.

(56) References Cited

U.S. PATENT DOCUMENTS

| | | | |
|---|---|---|---|
| 4,076,550 A | | 2/1978 | Thurn et al. |
| 4,359,342 A | * | 11/1982 | Stacy ....................... C08K 9/04 |
| | | | 106/490 |
| 4,709,065 A | | 11/1987 | Yoshioka et al. |
| 5,336,730 A | * | 8/1994 | Sandstrom ............ C08K 5/372 |
| | | | 152/905 |
| 5,504,137 A | | 4/1996 | Sandstrom et al. |
| 5,610,216 A | | 3/1997 | Sandstrom et al. |
| 5,641,820 A | | 6/1997 | Wideman et al. |
| 5,663,226 A | | 9/1997 | Scholl et al. |
| 5,733,963 A | | 3/1998 | Sandstrom et al. |
| 6,040,389 A | | 3/2000 | Wideman et al. |
| 6,220,323 B1 | | 4/2001 | Sandstrom et al. |
| 6,268,421 B1 | | 7/2001 | Dittrich et al. |
| 6,359,045 B1 | | 3/2002 | Jeske et al. |
| 6,521,684 B2 | | 2/2003 | Scholl et al. |
| 6,533,008 B1 | | 3/2003 | Lickes et al. |
| 6,797,757 B2 | | 9/2004 | Wideman et al. |
| 7,259,205 B1 | * | 8/2007 | Pagliarini ............ B60C 1/0016 |
| | | | 152/209.1 |
| 9,249,285 B2 | * | 2/2016 | Feldhues ................. B60C 1/00 |
| 2003/0060572 A1 | | 3/2003 | Causa et al. |
| 2008/0121330 A1 | * | 5/2008 | Choi ....................... C08K 5/098 |
| | | | 152/537 |
| 2014/0004155 A1 | | 1/2014 | Jiang et al. |
| 2015/0284547 A1 | * | 10/2015 | Feldhues ................. B60C 1/00 |
| | | | 524/526 |

FOREIGN PATENT DOCUMENTS

| | | |
|---|---|---|
| EP | 0489313 B1 | 8/1995 |
| EP | 2284023 A1 | 2/2011 |
| EP | 2311907 A1 | 4/2011 |
| JP | 4001175 A2 | 1/1992 |
| JP | 2010018691 A2 | 1/2010 |

OTHER PUBLICATIONS

European Search Report from European Patent Application No. 11164319, dated Oct. 31, 2011, two pages.
International Search Report from International Application No. PCT/EP2012/057854, dated Jul. 30, 2012, two pages.
Arisawa, Meiko, et al., "Rhodium-catalyzed sulfur atom exchange reaction between organic polysulfides and sulfur", Tetrahedron Letters 46 (2005), Science Direct, Elsevier Ltd., pp. 4797-4800.

* cited by examiner

*Primary Examiner* — Vickey Nerangis

(57) ABSTRACT

A silica-containing rubber mixture is produced from a rubber, a sulphur-containing alkoxysilane, a crosslinking agent, a silica-containing filler, and 0.1 to 15 parts by weight, based on 100 parts by weight of the rubber, of a silicon-free polysulphide additive of the formula (I)

$$A\text{-}S\text{-}(S)_x\text{-}S\text{-}B$$

where x is 0-4, and A and B are the same or different, are alkyl or aryl, and contain at last one oxygen, which may be in the form of a carboxyl group.

24 Claims, No Drawings

RUBBER MIXTURES CONTAINING SILICIC ACID AND SULFUR-CONTAINING ADDITIVES

The present invention relates to silica-containing rubber mixtures which comprise sulphur-containing additives, and to use of these and to rubber vulcanizates produced therefrom.

A number of proposed solutions have been devised for producing tyres with reduced rolling resistance. DE-A 2 255 577 and 4 435 311, EP-A1 0 0670 347, and also U.S. Pat. No. 4,709,065 have described certain polysulphidic silanes as reinforcing additives for silica-containing rubber vulcanizates. A disadvantage with the use of the polysulphidic silanes described in those documents as reinforcing additives for silica-containing rubber vulcanizates is however that relatively large amounts of the expensive polysulphidic silanes are required to achieve acceptable processability, and that hardness is unsatisfactory.

Further additional materials, such as fatty acid esters, fatty acid salts or mineral oils, have been proposed for improving the processability of silica-containing rubber mixtures. The additional materials mentioned have the disadvantage of increasing flowability but at the same time reducing the moduli at relatively high elongation (e.g. from 100% to 300%), or else the hardness, of the vulcanizates, and thus impairing the reinforcing effect of the filler. Inadequate hardness or stiffness of the vulcanizate results in unsatisfactory running performance of the tyre, particularly in curves.

An increase in the amount added in the reinforcing filler increases the hardness of the vulcanizate, but the higher viscosity of the mixture is disadvantageous for processability, and the same applies to a reduction in the amount of the plasticizing oil.

EP 1 134 253 describes polyether additives for silica-containing rubber vulcanizates which do not exhibit the abovementioned disadvantage of reducing the modulus. However, the person skilled in the art requires a usage amount of 8% by weight of the product, based on the rubber, in order to increase the Shore A hardness value by 3 units. The low modulus at 300% elongation is disadvantageous.

EP 0 489 313 describes additives with good mechanical properties and with improved hysteresis performance. However, the examples reveal only slight, or no, increase of Shore A hardness in comparison with the prior art, bis[3-(triethoxysilyl)propyl]tetrasulphide according to German Offenlegungsschrift 2 255 577, and therefore no improvement of interaction between polymer and filler.

EP 1 000 968 moreover uses bis[3-(triethoxysilyl)propyl] tetrasulphides in combination with a specific reversion stabilizer in SBR, where the 300 modulus values are very low and therefore inadequate.

EP 0 791 622 B1 describes a rubber composition with at least one diene-based elastomer, filler composed of silica and of carbon black, and also with silica-coupling agent selected from
tetrathiodipropanol polysulphide mixture or
(ii) combination of tetrathiodipropanol polysulphide and bis(3-trialkoxysilylalkyl)polysulphide. In particular, the amount of tetrathiodipropanol polysulphide is markedly greater than the amount of bis(3-trialkoxysilylalkyl)polysulphide, and this is not advantageous economically because the tetrathiodipropanol polysulphide is relatively expensive. In addition, the said mixture exhibits very low tensile strength values. It can be concluded that the said mixture is too soft (as confirmed by the Shore A values measured), as reflected in relatively poor running performance of the tyre, and also a shortened lifetime.

It is an object of the present invention to provide rubber mixtures which comprise a specific combination of additional materials which do not impair the flowability of rubber mixtures and provide vulcanizates produced therefrom with good properties, in particular in respect of rolling resistance, abrasion and wet grip in tyres, while simultaneously markedly increasing the hardness or stiffness of the vulcanizate, with the possibility of resultant improvement in the running performance of tyres.

Surprisingly, it has now been found that, in combination with sulphur-containing alkoxysilanes, certain sulphur-containing additives do not adversely affect the flowability of rubber mixtures and lead to vulcanizates with good dynamic performance and with markedly increased hardness/stiffness and particularly to less abrasion.

The synergetic effect is believed to result from improved interaction between polymer and filler.

The invention therefore provides rubber mixtures produced from at least one rubber, from a sulphur-containing alkoxysilane, from a crosslinking agent, from a filler, and optionally from further rubber auxiliaries, and also from at least one silicon-free sulphur-containing additive of the formula

in which x is 0, 1, 2, 3 or 4
A is a moiety

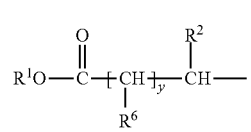

and
B is a moiety

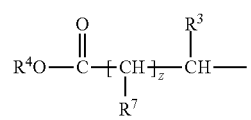

where
$R^1$ to $R^4$ are identical or different and are hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl, and
$R^6$ to $R^7$ are identical or different and are hydrogen $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2COOR^5$, with $R^5$=hydrogen, $C_1$-$C_6$-alkyl, $C_5$-$C_6$-cycloalkyl, $C_6$-$C_{10}$-aryl or $C_1$-$C_6$-acyl and
y, z are mutually independently 0, 1 or 2, or
A and B are mutually independently one of the moieties

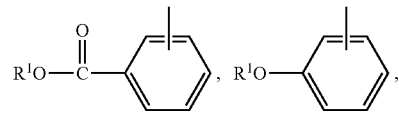

in which $R^1$ and $R^2$ are identical or different and are hydrogen, $C_1$-$C_6$-alkyl, $C_5$-$C_6$-cycloalkyl, $C_6$-$C_{10}$-aryl or a group —$CH_2$—$OR^5$, —$CH_2$—$CH_2$—$OR^5$, —$NHR^5$, —$COR^5$, —$COOR^5$, —$CH_2COOR^5$, where $R^5$=hydrogen, $C_1$-$C_6$-alkyl, $C_5$-$C_6$-cycloalkyl, $C_6$-$C_{10}$-aryl or $C_1$-$C_6$-acyl.

The expressions silicon-free sulphur-containing additive, polysulphide additive, silicon-free polysulphide additive and silicon-free polysulphide additive of the formula (I), and all formulae that derive therefrom, listed in the claims, are used as synonyms.

It is preferable to use at least one of the compounds of the formula (II) as polysulphide additive,

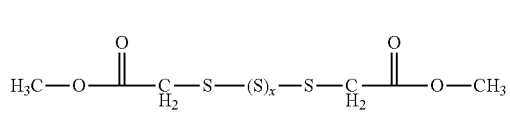

(II)

in which
x is 0, 1, 2, 3 or 4, particularly preferably 2.

It is preferable to use at least one of the compounds of the formula (IIa) as polysulphide additive,

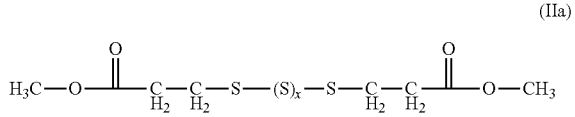

(IIa)

in which x is 0, 1, 2, 3 or 4, particularly preferably 2.

It is preferable to use at least one of the compounds of the formulae (III), (IIIa), (IIIb) as polysulphide additive,

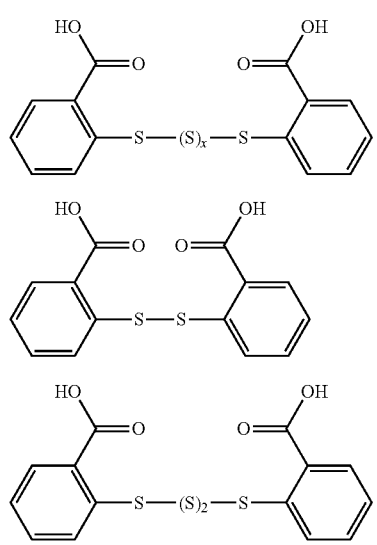

in which x is 0, 1, 2, 3 or 4, particularly preferably 2 and 0.

The examples list other preferred polysulphide additives.

It is preferable that the silica-containing rubber mixture according to the invention comprises at least one SBR rubber and at least one BR rubber.

It preferably comprises at least one SBR rubber and at least one BR rubber in an SBR:BR ratio by weight of from 60:40 to 90:10.

It can preferably also comprise at least one NR rubber.

It is preferable that it comprises at least one SBR rubber and at least one BR rubber and at least one NR rubber in a ratio of at least 60 and at most 85 percent by weight of SBR, based on rubber, and at least 10 and at most 35 percent by weight of BR, based on rubber, and at least 5 and at most 20 percent by weight of NR, based on rubber.

Synthetic rubbers are also suitable, alongside natural rubber, for producing the rubber mixtures according to the invention and the rubber vulcanizates according to the invention. Preferred synthetic rubbers are described by way of example in W. Hofmann, Kautschuktechnologie [Rubber technology], Genter-Verlag, Stuttgart 1980.

They encompass inter alia
BR—polybutadiene
ABR—butadiene/$C_1$-$C_4$-alkyl acrylate copolymer
CR—polychloroprene
IR—polyisoprene
SBR—styrene/butadiene copolymers with styrene contents of from 1 to 60% by weight, preferably from 20 to 50% by weight
IIR—isobutylene/isoprene copolymers
NBR—butadiene/acrylonitrile copolymers with acrylonitrile contents of from 5 to 60% by weight, preferably from 10 to 50% by weight
HNBR—partially hydrogenated or completely hydrogenated NBR rubber
EPDM—ethylene/propylene/diene copolymers
and mixtures of these rubbers.

It is preferable that the silica-containing rubber mixtures also comprise from 0.3 to 7 parts by weight of one or more silicon-free polysulphide additives of the formula (I) or of any of the formulae derived therefrom, as listed in the claims, based on 100 parts by weight of rubber used.

It is preferable that the amount of sulphur-containing alkoxysilane is greater than or equal to the amount of the silicon-free polysulphide additive.

It is preferable that the sulphur-containing alkoxysilane is used in a ratio by weight of from 1.5:1 to 20:1, particularly from 5:1 to 15:1, in relation to the silicon-free polysulphide additive.

It is preferable that the rubber mixture according to the invention comprises from 0.5 to 5 parts by weight, based on 100 parts by weight of rubber used, of a silicon-free polysulphide additive.

The present invention further provides rubber vulcanizates which can be produced from the rubber mixtures according to the invention.

The present invention further provides a process for producing filled rubber vulcanizates, characterized in that
i) at least one rubber is mixed with
ii) from 10 to 150% by weight, preferably from 30 to 120% by weight, based on rubber (i), of filler and
iii) from 0.1 to 15% by weight, preferably from 0.3 to 7% by weight, based on rubber (i), of silicon-free polysulphide additives
where the temperatures of the composition are at least 120° C. and shear rates are from 1 to 1000 sec (exp. −1), preferably from 1 to 100 sec (exp. −1) and the mixture is then vulcanized conventionally after addition of further vulcanization chemicals.

The silicon-free polysulphide additives according to the invention are preferably added in the first portion of the mixing process when temperatures of the composition are from 100 to 200° C. and the shear rates are those mentioned, but it can also be added later at lower temperatures (from 40 to 100° C.), for example together with sulphur and accelerator.

The form in which the silicon-free polysulphide additives are added to the mixing process can either be pure form or else a form absorbed on inert, organic or inorganic carriers. Preferred carrier materials are silica, natural or synthetic silicates, aluminium oxide and/or carbon black.

For the purposes of this invention, silica-containing fillers that can be used for the rubber mixture and rubber vulcanizates according to the invention comprise the following fillers:

fine-particle silica, produced for example by precipitation from solutions of silicates or flame hydrolysis of silicon halides with specific surface areas of from 5 to 1000 $m^2/g$, preferably from 20 to 400 $m^2/g$ (BET surface area) and with primary particle sizes of from 10 to 400 nm. The silicas can optionally also take the form of mixed oxides with other metal oxides, such as Al, Mg, Ca, Ba, Zn, Zr, Ti oxides, Synthetic silicates, such as aluminium silicate, alkaline earth metal silicates, such as magnesium silicate or calcium silicate, with BET surface areas of from 20 to 400 $m^2/g$ and primary particle size of from 10 to 400 nm, natural silicates, such as kaolin and other naturally occurring silicas, glass fibres and glass-fibre products (mats, strands) or glass microbeads.

Other fillers that can be used are carbon blacks. The carbon blacks to be used here are produced by way of example by the lamp-black process, furnace-black process or gas-black process and have BET surface areas of from 20 to 200 $m^2/g$, examples being SAF, ISAF, IISAF, HAF, FEF, or GPF carbon black.

Amounts preferably used of the silicon-free polysulphide additives in the rubber mixtures according to the invention are from 0.3 to 7%, based on rubber.

One particularly preferred variant consists in the combination of silica, carbon black and silicon-free polysulphide additives. The ratio of silica to carbon black in this combination can be varied within any desired limits. For the purposes of tyre technology, preference is given to silica: carbon black ratios of from 20:1 to 1.5:1.

Sulphur-containing silanes that can be used for the rubber vulcanizates according to the invention are preferably bis(triethoxysilylpropyl) tetrasulphane and the corresponding disulphane and 3-triethoxysilyl-1-propanethiol or silanes such as Si 363 from Evonik, Germany or silane NXT or NXT Z from Momentive (previously GE, USA), where the alkoxy moiety is methoxy or ethoxy where amounts used are from 2 to 20 parts by weight, preferably from 3 to 11 parts by weight, calculated in each case as 100% strength active ingredient and based on 100 parts by weight of rubber. However, it is also possible to use a mixture made of the said sulphur-containing silanes. Liquid sulphur-containing silanes can have been absorbed on a carrier to improve ease of metering and/or ease of dispersion (dry liquid). Active ingredient content is from 30 to 70 parts by weight, preferably from 40 to 60 parts by weight, for every 100 parts by weight of dry liquid.

The rubber vulcanizates according to the invention can comprise other rubber auxiliaries, for example reaction accelerators, antioxidants, heat stabilizers, light stabilizers, antiozonants, processing aids, plasticizers, tackifiers, blowing agents, dyes, pigments, waxes, extenders, organic acids, retardants, metal oxides, and also activators, such as triethanolamine, polyethylene glycol, hexanetriol, where these are known to the rubber industry.

The amount used of the rubber auxiliaries is conventional and depends inter alia on the intended purpose of the vulcanizates. Conventional amounts, based on rubber, are from 0.1 to 30% by weight.

The following are used as crosslinking agents: peroxides, sulphur, magnesium oxide, zinc oxide, and the known vulcanization accelerators can also be added to these, for example mercaptobenzothiazoles, -sulphenamides, thiurams, thiocarbamates, guanidines, xanthogenates and thiophosphates. Preference is given to sulphur.

The amounts used of the crosslinking agents and vulcanization accelerators are about 0.1 to 10% by weight, preferably 0.1 to 5% by weight, based on rubber.

As mentioned above, it is advantageous to add antioxidants to the rubber mixture to counteract the effect of heat and oxygen. Suitable phenolic antioxidants are alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioether, 2,2'-methylenebis(4-methyl-6-tert-butylphenol) (BPH), and also sterically hindered thiobisphenols.

If discoloration of the rubber is not significant, are also used, aminic antioxidants, e.g. mixtures of diaryl-p-phenylenediamines (DTPD), octylated diphenylamine (ODPA), phenyl-α-naphthylamine (PAN), phenyl-β-naphthylamine (PBN), preferably those based on phenylenediamine. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD).

Among the other antioxidants are phosphites such as tris(nonylphenyl)phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic antioxidants. TMQ, MBI and MMBI are mainly used for NBR types which are vulcanized peroxidically.

Ozone resistance can be improved by using antioxidants known to a person skilled in the art, such as N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD), enol ethers or cyclic acetals.

Processing aids are intended to act between the rubber particles and to counteract frictional forces during the mixing, plastification and shaping process. Processing aids which can be present in the rubber mixture according to the invention are any of the lubricants conventionally used for the processing of plastics, for example hydrocarbons, such as oils, paraffins and PE waxes, fatty alcohols having from 6 to 20 carbon atoms, ketones, carboxylic acids, such as fatty acids and montanic acids, oxidized PE wax, metal salts of carboxylic acids, carboxamides and carboxylic esters, for example with the following alcohols: ethanol, fatty alcohols, glycerol, ethanediol, pentaerythritol, and long-chain carboxylic acids as acid component.

The rubber mixture can be crosslinked not only with sulphur accelerator systems but also with peroxides. Examples of crosslinking agents that can be used are peroxidic crosslinking agents such as bis(2,4-dichlorobenzyl) peroxide, dibenzoyl peroxide, bis(4-chlorobenzoyl) peroxide, 1,1-bis(tert-butylperoxy)-3,3,5-trimethylcyclohexane, tert-butyl perbenzoate, 2,2-bis(tert-butylperoxy)butene, 4,4-di-tert-butyl peroxynonylvalerate, dicumyl peroxide, 2,5-dimethyl-2,5-di(tert-butylperoxy)hexane, tert-butylcumyl peroxide, 1,3-bis(tert-butylperoxyisopropyl)benzene, di-tert-butyl peroxide and 2,5-dimethyl-2,5-di(tert-butylperoxy)hex-3-yne.

It can be advantageous to use, alongside the said peroxidic crosslinking agents, further additions which can be used to increase crosslinking yield: a suitable example here being triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

Another crosslinking agent that can be used is sulphur in elemental soluble or insoluble form or sulphur donors.

Examples of sulphur donors that can be used are dimorpholyl disulphide (DTDM), 2-morpholino-dithiobenzothiazole (MBSS), caprolactam disulphide, dipentamethylenethiuram tetrasulphide (DPTT), and tetramethylthiuram disulphide (TMTD).

For the sulphur-vulcanization of the rubber mixture according to the invention, it is also possible to use further additions which can be used to increase crosslinking yield. In principle, however, it is also possible to use sulphur or sulphur donors alone for crosslinking.

Examples of suitable additions which can be used to increase crosslinking yield are dithiocarbamates, thiurams, thiazoles, sulphenamides, xanthogenates, bi- or polycyclic amines, guanidine derivatives, dithiophosphates, caprolactams and thiourea derivatives.

Examples of equally suitable additions are: diammine zinc diisocyanate, hexamethylenetetramine, 1,3-bis(citraconimidomethyl)benzene and also cyclic disulphanes.

Preference is given to the sulphur accelerator system in the rubber mixture according to the invention.

In order to reduce flammability and to reduce smoke generation during combustion, the rubber mixture composition according to the invention can also comprise flame retardants. An example of a flame retardant used is antimony trioxide, phosphoric esters, chloroparaffin, aluminium hydroxide, boron compounds, zinc compounds, molybdenum trioxide, ferrocene, calcium carbonate or magnesium carbonate.

The rubber vulcanizate can also comprise further synthetic polymers, acting by way of example as polymeric processing aids or impact modifiers. The said synthetic polymers are selected from the group consisting of the homo- and copolymers based on ethylene, propylene, butadiene, styrene, vinyl acetate, vinyl chloride, glycidyl acrylate, glycidyl methacrylate, acrylates and methacrylates having alcohol components of branched or unbranched C1-C10-alcohols. Particular mention may be made of polyacrylates having identical or different alcohol moieties from the group of the C4-C8-alcohols, particularly of butanol, hexanol, octanol and 2-ethylhexanol, polymethyl methacrylate, methyl methacrylate-butyl acrylate copolymers, methyl methacrylate-butyl methacrylate copolymers, ethylene-vinyl acetate copolymers, chlorinated polyethylene, ethylene-propylene copolymers, ethylene-propylene-diene copolymers.

The rubber vulcanizate according to the invention can be used for producing foams. For this, chemical or physical blowing agents are added. Chemical blowing agents that can be used are any of the substances known for this purpose, for example azodicarbonamide, p-toluolsulphonyl hydrazide, 4,4'-oxybis(benzenesulphonyl hydrazide), p-toluenesulphonylsemicarbazide, 5-phenyltetrazole, N,N'-dinitrosopentamethylenetetramine, zinc carbonate or sodium hydrogencarbonate, and also mixtures comprising these substances. An example of a suitable physical blowing agent is carbon dioxide or halogenated hydrocarbons.

The vulcanization process can take place at temperatures of from 100 to 200° C., preferably from 130 to 180° C., optionally under a pressure of from 10 to 200 bar.

The blending of the rubber with the filler and with the silicon-free polysulphide additives can be carried out in/on conventional mixing assemblies, for example rolls, internal mixers and mixing extruders.

The rubber vulcanizates according to the invention are suitable for producing mouldings with improved properties, e.g. for producing cable sheathing, hoses, drive belts, conveyor belts, roll coverings, tyres, shoe soles, sealing rings and damping elements.

An important factor in the processing of rubbers is that the rubber mixture initially prepared with the additives has low flow viscosity (Mooney viscosity ML 1+4/100° C.), so that it is easy to process. In many applications, the intention is that the vulcanization process which follows (for example at 170° C., t95) for the rubber mixture is to proceed as rapidly as possible with exposure to heat, in order to restrict the cost of time and of energy.

The scorch time (for example t5) is intended to be relatively long, depending on the shaping process.

It is preferable that the loss factor tan delta of a vulcanizate produced from the silica-containing rubber mixture according to the invention by heating at 170° C./t95 is <0.2 at 60° C. and that the Shore A hardness thereof is simultaneously >67 at 23° C., and it is particularly preferable that the loss factor tan delta is <0.17 at 60° C. and that the shore A hardness is simultaneously >70 at 23° C. The 300 modulus value of the vulcanizate is >12 MPa, preferably >15 MPa.

It is preferable that the loss factor tan delta of a vulcanizate produced from the silica-containing rubber mixture by heating at 170° C./t95 is less than 0.17 at 60° C. and that its scorch time is simultaneously greater than 1000 seconds.

It is preferable that the loss factor tan delta of a vulcanizate produced from the silica-containing rubber mixture by heating at 170° C./t95 is less than 0.17 at 60° C. and that its full vulcanization time is simultaneously less than 2000 seconds.

It is preferable that the scorch time of a vulcanizate produced from the silica-containing rubber mixture by heating at 170° C./t95 is greater than 1000 seconds and that its full vulcanization time is simultaneously less than 2000 seconds.

The ML 1+4 viscosity of the silica-containing rubber mixture at 100° C. is preferably less than 150, preferably less than 100, particularly preferably less than 95.

A further invention is the use of the silica-containing rubber mixture according to the invention for producing vulcanizates and rubber mouldings of any type, in particular for producing tyres and tyre components.

The automobile industry has been searching for cost-effective ways of reaching the target of no more than 130 g/km of $CO_2$ emission, at least since the European Union has been concerned with the limits for carbon dioxide emission from cars. Low-rolling-resistance tyres are of substantial importance here. They reduce fuel consumption by requiring less energy for deformation during free wheeling.

In order that the reduction of rolling resistance is not achieved at the cost of other important properties, the requirements relating to wet grip and rolling noise are also simultaneously refined. A first indication of wet grip and rolling resistance is given by the loss factor tan delta. This should be as high as possible at 0° C. (good wet grip) and as low as possible at from 60 to 70° C. (low rolling resistance). The hardness of a rubber vulcanizate gives a first indication of its stiffness.

EXAMPLES

Example 1

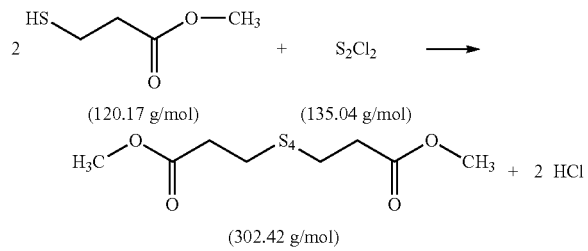

Apparatus: 500 ml four-necked flask with thermometer, dropping funnel with pressure equalization, reflux condenser with gas-discharge attachment (bubble counter) and tubing, stirrer Initial charge: 91.75 g=0.75 mol of methyl 3-mercaptopropionate (Acros, ≥98%) of 250 ml cyclohexane (p.A., Merck, dried over molecular sieve)

Feed: 51.15 g=0.375 mol of disulphur dichloride (≥99%, Merck)

Dried cyclohexane and methyl 3-mercaptopropionate are used as initial charge in the nitrogen-flushed apparatus. Once the methyl 3-mercaptopropionate has been completely dissolved, the disulphur dichloride is added dropwise within about 1 h with nitrogen blanketing at a temperature of from 5 to 10° C. The feed rate is to be adjusted so as to avoid exceeding a temperature of 10° C.

Once the reaction has ended, stirring is continued overnight at room temperature under nitrogen blanketing.

The reaction solution is then concentrated by rotating on a Rotavapor at 50° C., and is then dried to constant weight at 60° C. in a vacuum drying oven.

Yield: 108.4 g (95.6%) of a polysulphide mixture of the idealized formula

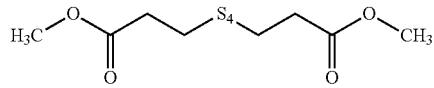

Example 2

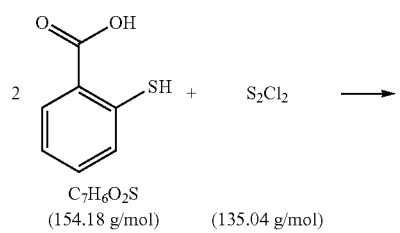

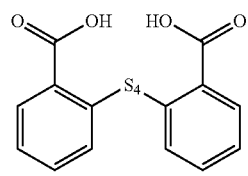

Apparatus: 2000 ml four-necked flask with thermometer, dropping funnel with pressure equalization, reflux condenser with gas-discharge attachment (bubble counter) and tubing, stirrer, gas-inlet tube Initial charge: 118.0 g=0.75 mol of mercaptobenzoic acid (Aldrich, 99%) 900 ml toluene (p.A., Aldrich, dried over molecular sieve Feed: 57.15 g=0.375 mol of disulphur dichloride (≥99%, Merck)

Dried toluene and mercaptobenzoic acid are used as initial charge in the nitrogen-flushed apparatus. The disulphur dichloride is now added dropwise to the present suspension within about 1 h with nitrogen blanketing at a temperature of from 0 to 5° C. The feed rate is to be adjusted so as to avoid exceeding a temperature of 5° C.

Once the reaction has ended, stirring is continued overnight at room temperature under nitrogen blanketing.

The reaction solution is the subjected to suction filtration using a D4 frit and washed twice with approx. 200 ml dry toluene. The product is dried at room temperature (approx 25° C.) in a vacuum drying oven.

Yield: 144.6 g (104.1%) of a polysulphide mixture of the idealized formula

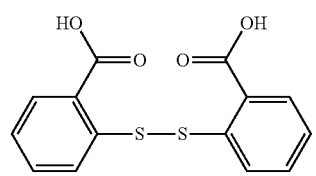 [SMILES: O=C(O)c1ccccc1SSc1ccccc1C(=O)O]

Example 3

Results:

The examples below provide further explanation of invention, but there is no intention that the invention be restricted thereby.

The following rubber formulations, listed in Table 1, were selected for the tests. Unless otherwise stated, all numeric data are based on "parts per hundred rubber" (phr).

The following rubber mixtures were produced in a 1.5 L internal mixer (70 rpm), start temperature 80° C., mixing time: 5 minutes. Sulphur and accelerator were finally admixed on a roll (temperature: 50° C.).

TABLE 1

Rubber formulation

| | Reference | Example 1 | Example 2 | Example 3 |
|---|---|---|---|---|
| BUNA CB 24 (oil-extended rubber from Lanxess Deutschland GmbH) | 30 | 30 | 30 | 30 |
| BUNA VSL 5025-1 (Lanxess Deutschland GmbH) | 96 | 96 | 96 | 96 |
| CORAX N 339 (commercially available carbon black) | 6.4 | 6.4 | 6.4 | 6.4 |
| VULKASIL S (precipitated silica from Lanxess Deutschland GmbH) | 80 | 80 | 80 | 80 |
| TUDALEN 1849-1 (mineral oil) | 8 | 8 | 8 | 8 |
| EDENOR C 18 98-100 | 1 | 1 | 1 | 1 |
| VULKANOX 4020/LG | 1 | 1 | 1 | 1 |
| VULKANOX HS/LG | 1 | 1 | 1 | 1 |
| ROTSIEGEL ZINC WHITE | 2.5 | 2.5 | 2.5 | 2.5 |
| ANTILUX 654 | 1.5 | 1.5 | 1.5 | 1.5 |
| SI 69 | 6.4 | 6.4 | 6.4 | 6.4 |
| VULKACIT D/C | 2 | 2 | 2 | 2 |
| VULKACIT CZ/C | 1.5 | 1.5 | 1.5 | 1.5 |
| CHANCEL 90/95 GRIND SULPHUR | 1.5 | 1.5 | 1.5 | 1.5 |
| Example 1 | | 1 | | |
| Example 2 | | | 1 | |
| Example 3 | | | | 1 |

TABLE 2

Collation of results

| Parameter | Unit | DIN | Reference | Example 1 | Example 2 | Example 3 |
|---|---|---|---|---|---|---|
| Mooney viscosity (ML 1 + 4) | [MU] | 53523 | 95 | 82 | 92 | 93 |
| Mooney scorch time at 130° C. (t5) | sec | acc. to ASTM D 5289-95 | 1253 | 1244 | 1228 | 1198 |
| Full vulcanization at 170° C./t95 | sec | 53529 | 1417 | 1617 | 1315 | 1544 |
| Shore A hardness at 23° C. | [Shore A] | 53505 | 66 | 72 | 73 | 73 |
| 300 modulus | MPa | 53504 | 15 | 17 | 18 | 17 |
| Elongation at break | % | 53504 | 349 | 346 | 308 | 332 |
| Tensile strength | MPa | 53504 | 19 | 20 | 18 | 19 |
| Abrasion | mm³ | 53516 | 74 | 95 | 93 | 82 |
| Wet grip (tan d (0° C.)) | — | | 0.463 | 0.444 | 0.452 | 0.385 |
| Rolling resistance (tan d (60° C.)) | — | | 0.133 | 0.168 | 0.154 | 0.160 | respective viscosity. The specimen is generally preheated to 100° C. for 1 minute; the measurement takes a further 4 minutes, while the temperature is held constant.

The viscosity is given together with the respective test conditions, an example being ML (1+4) 100° C. (Mooney viscosity, large rotor, preheat time and test time in minutes, test temperature).

The viscosities of the rubber mixtures specified in table 1 are measured by means of a Mooney shearing-disk viscometer.

Scorch Performance (t5 Scorch Time):

The same test can also be used as described above to measure the "scorch" performance of a mixture. The temperature selected in this patent is 130° C. The rotor runs until, after the torque value has passed through a minimum, it has risen to 5 Mooney units relative to the minimum value (t5). The greater the value (the unit here being seconds), the slower the scorch (high scorch values here).

Rheometer (Vulcameter) 170° C./t95 Full Vulcanization Time:

The progress of vulcanization in a MDR (moving die rheometer) and analytical data therefor are measured in accordance with ASTM D5289-95 in a MDR 2000 Monsanto rheometer. Table 2 collates the results of this test.

The time at which 95% of the rubber has crosslinked is measured as the full vulcanization time. The temperature selected was 170° C.

Surprisingly, as shown by the results in Table 2, hardness (Shore A) measured in all of the examples was higher in comparison with the reference. The mechanical properties, such as tensile strength, elongation at break and 300 modulus, remained almost unaltered here. All of the vulcanizates tested exhibit comparable good wet grip and comparable good rolling resistance when compared with the reference (tan delta at 0° C.>0.35 and tan delta at 60° C.<0.2) and likewise very advantageous abrasion values (<100 mm³).

Testing of the Rubber Mixture and of the Vulcanizates:

Mooney Viscosity Measurement:

Viscosity can be determined directly from the resisting force exerted by the rubbers (and rubber mixtures) while they are processed. In the Mooney shearing-disc viscometer a grooved disc is surrounded above and below by sample substance and is rotated at about two revolutions per minute in a heatable chamber. The force required for this purpose is measured in the form of torque and corresponds to the Determination of Hardness:

In order to determine the hardness of the rubber mixture according to the invention, milled sheets of thickness 6 mm made of the rubber mixture were produced according to formulations from table 1. Test specimens of diameter 35 mm were cut from the milled sheets, and the Shore A hardness values were determined for these by means of a digital Shore hardness tester (Zwick GmbH & Co. KG, Ulm).

Tensile Test:

The tensile test serves directly to determine the loading limits of an elastomer. The longitudinal elongation at break is divided by the initial length to give the elongation at break. The force required to reach certain stages of elongation, mostly 50, 100, 200 and 300%, is also determined and expressed as modulus (tensile strength at the given elongation of 300%, or 300 modulus).

Table 2 lists the test results.

Dyn. Damping:

Dynamic test methods are used to characterize the deformation performance of elastomers under loadings which change periodically. An external stress changes the conformation of the polymer chain.

This measurement determines the loss factor tan delta indirectly by way of the ratio between loss modulus G" and storage modulus G'.

What is claimed is:

1. Silica-containing rubber mixture comprising: rubber, a sulphur-containing alkoxysilane, a crosslinking agent, a silica-containing filler, and 0.1 to 15 parts by weight, based on 100 parts by weight of the rubber used, of a silicon-free polysulphide additive of the formula (I)

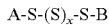     (I)

in which:
x is 1, 2, 3 or 4 and
A and B are independently one of —CH$_2$CH$_2$COOCH$_3$ or —CH$_2$COOCH$_3$, or
and
A and B are

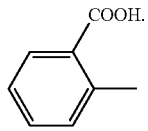

2. The silica-containing rubber mixture according to claim 1, wherein the polysulphide additive comprises at least one compound of the formula (II),

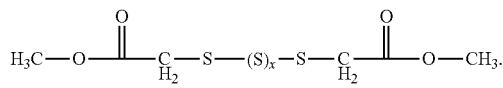

3. The silica-containing rubber mixture according to claim 1, wherein the polysulphide additive comprises at least one compound of the formula (IIa),

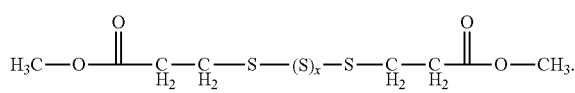

4. The silica-containing rubber mixture according to claim 1, wherein the polysulphide additive comprises at least one compound of the formulae (III),

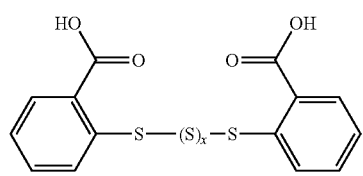

in which x is 1, 2, 3 or 4.

5. The silica-containing rubber mixture according to claim 1, wherein the mixture comprises an amount of sulphur-containing alkoxysilanes that is greater than or equal to an amount of silicon-free polysulphide additives.

6. The silica-containing rubber mixture according to claim 1, wherein the mixture comprises at least one SBR rubber and at least one BR rubber.

7. The silica-containing rubber mixture according to claim 6, wherein the mixture comprises an SBR:BR ratio by weight of from 60:40 to 90:10.

8. The silica-containing rubber mixture according to claim 7, further comprising at least one NR rubber.

9. The silica-containing rubber mixture according to claim 8, wherein the mixture comprises a ratio of at least 60 and at most 85 percent by weight of SBR, based on rubber, and at least 10 and at most 35 percent by weight of BR, based on rubber, and at least 5 and at most 20 percent by weight of NR, based on rubber.

10. The silica-containing rubber mixture according to claim 1, wherein the mixture comprises from 1 to 15 parts by weight of one or more sulphur-containing alkoxysilanes, based on 100 parts by weight of rubber used.

11. The silica-containing rubber mixture according to claim 1, wherein the mixture comprises from 0.3 to 7 parts by weight of one or more silicon-free polysulphide additives, based on 100 parts by weight of rubber used.

12. The silica-containing rubber mixture according to claim 1, wherein the mixture comprises a ratio by weight of from 1.5:1 to 20:1 of the sulphur-containing alkoxysilane in relation to the silicon-free polysulphide additive.

13. The silica-containing rubber mixture according to claim 1, wherein the mixture comprises from 0.5 to 5 parts by weight, based on 100 parts by weight of rubber used, of the silicon-free polysulphide additive.

14. The silica-containing rubber mixture according to claim 1, wherein the mixture further comprises one or more additional inorganic and/or organic fillers, where the amounts of the fillers are 50 to 200 parts by weight based on 100 parts by weight of rubbers used.

15. The silica-containing rubber mixture according to claim 14, wherein the fillers are selected from the group of oxidic and silicatic fillers, and carbon blacks, or a mixture of these.

16. The silica-containing rubber mixture according to claim 15, wherein at least one filler is selected from the group of precipitated silicas and/or silicates with a specific surface area of from 20 to 400 m$^2$/g.

17. The silica-containing rubber mixture according to claim 1, wherein a loss factor tan delta of a vulcanizate produced therefrom by heating at 170° C./t95 is <0.2 at 60° C. and a Shore A hardness thereof is simultaneously >67 at 23° C., and a 300 modulus value thereof is >12 MPa.

18. The silica-containing rubber mixture according to claim 1, where a loss factor tan delta of a vulcanizate produced therefrom by heating at 170° C./t95 is <0.17 at 60° C., and a Shore A hardness thereof is simultaneously >70 at 23° C., and a 300 modulus value thereof is >15 MPa.

19. The silica-containing rubber mixture according to claim 1, where a loss factor tan delta of a vulcanizate produced therefrom by heating at 170° C./t95 is less than 0.17 at 60° C., and a scorch time of the vulcanizate is simultaneously greater than 1000 seconds.

20. The silica-containing rubber mixture according to claim 1, where a loss factor tan delta of a vulcanizate produced therefrom by heating at 170° C./t95 is less than 0.17 at 60° C., and a full vulcanization time of the vulcanizate is simultaneously less than 2000 seconds.

21. The silica-containing rubber mixture according to claim 1, where a scorch time of a vulcanizate produced therefrom by heating at 170° C./t95 is greater than 1000 seconds, and a full vulcanization time of the vulcanizate is simultaneously less than 2000 seconds.

22. The silica-containing mixture according to claim 1, wherein an ML 1+4 viscosity of the mixture at 100° C. is less than 150.

23. A method for producing vulcanizates and rubber moulding, the method comprising producing vulcanizates and rubber mouldings from the rubber mixture according to claim 1.

24. Vulcanizates and rubber mouldings comprising the rubber mixtures according to claim 1.

* * * * *